Dec. 7, 1965   A. BOHLE   3,221,405

GLASS CUTTER

Filed March 11, 1964

INVENTOR
August Bohle
By
Lowry & Rinehart
ATTYS.

3,221,405
GLASS CUTTER
August Bohle, 13 Grenzstrasse, Solingen-Ohligs, Germany
Filed Mar. 11, 1964, Ser. No. 351,091
1 Claim. (Cl. 30—164.95)

This invention relates to glass cutters, and more specifically to a glass cutter of the type including a handle and a cutter head secured thereto, and having at least one cutting wheel rotatably mounted in a housing exchangeably attachable to the free end of the cutter head.

In the known glass cutters of this type, which are provided with two or more cutting wheels exchangeable together with their housing, such cutting wheels are circularly and rotatably mounted between a supporting plate and a cover plate rigidly connected with the supporting plate. In this arrangement, one of the cutting wheels is always ready to be used for a cutting operation, i.e. in the cutting position. The housing accommodating the cutting wheels and defined by the supporting plate and the cover plate is rotatably guided in a recess in the cutter head and held in position there by a clamping plate bearing against the housing and adapted to be secured together with the cutter head. However, the accommodation of the cutting wheels in such a housing considerably increases the cost both of the reserve cutting wheels and of the glass cutter because, after the cutting wheels have been pushed onto pivots on the supporting plate, the latter must be riveted together with a cover plate and the glass cutter must be provided with the clamping plate serving to hold the housing of the cutting wheels on the cutter head. Since it is also difficult in the aforedescribed glass cutters to adjust the respective cutting wheel in its proper working position and to maintain it therein when clamping the housing of the cutting wheels, it has also been proposed to provide a plate of the housing of the cutting wheels, which is facing the clamping plate of the glass cutter, with peripheral edges corresponding in number to the number of the cutting wheels and to provide the clamping plate on its two longitudinal edges with angularly bent portions by which the clamping plate bears against two parallel surfaces of the associated plate of the housing of the cutting wheels. This construction of one of the plates of the cutting wheel housing and of the clamping plate does ensure a reliable and also immovable seat of the respective cutting wheel which is in the working position, it is true, but this additional development of the cutting wheel housing and of the clamping plate also further increases the production cost for these parts.

It is the object of the present invention to simplify the housing for the cutting wheels and the mounting of the cutting wheels within the housing as well as the mounting of the housing on the cutter head, thereby to reduce simultaneously the production cost of these parts.

To achieve this object, the invention provides a glass cutter which comprises a handle, a cutter head attached to said handle and having a free bifurcate end including two parallel extensions, a housing of flexible material and of a configuration defining two opposite guides for the exchangeable and fittting attachment of said housing to said two parallel extensions, two pairs of crosswise extending recesses in said housing at opposite peripheries thereof and arranged between said two opposite guides, an axle mounted in one of said crosswise extending recesses of either pair thereof and a cutting wheel mounted on said axle so as to be rotatable in the other one of said crosswise extending recesses of either pair thereof.

The flexible housing for the cutting wheels is more simple and inexpensive in production than the known housings since it is made in one piece, and the axles of the cutting wheels need only be clamped in the recesses provided for receiving them at the periphery of the housing, the cutting wheels being freely rotatable in the recesses crossing the recesses in which cutting wheel axles are mounted. Further, all additional clamping and screw means which have been hitherto required for mounting the housing on the cutter head are eliminated, since the housing due to its production from flexible material is clampingly received between the parallel extensions of the bifurcate end of the cutter head. The fact that the housing is provided with two cutting wheels only cannot be considered a disadvantage over housings having a larger number of cutting wheels, since practice has shown that any larger number of cutting wheels is subject to corrosion when the glass cutter is not in constant used.

A preferred embodiment of the invention will now be described by way of example and with reference to the accompanying drawing, in which.

Figure 1:
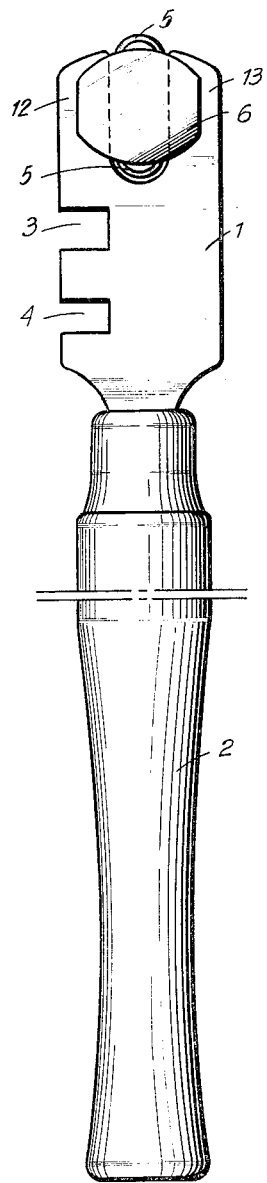
FIG. 1 is an elevational view of a glass cutter according to the invention.
Figure 2:
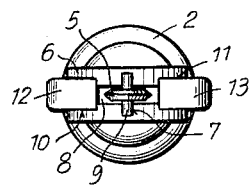
FIG. 2 is a top plan view of the glass cutter.
Figure 3:
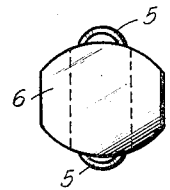
FIG. 3 is an elevational view of a detail of FIG. 1, constituting the housing for the cutting wheels of the glass cutter.
Figure 4:
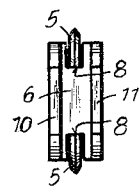
FIG. 4 is a side elevational view of the cutting wheel housing of FIG. 3.

FIG. 1 shows a glass cutter including a handle 2 and a cutter head 1 secured to the handle 2. The cutter head 1 has a bifurcate free end with parallel extensions 12 and 13 and is provided in one of its longitudinal edges with recesses 3 and 4 for breaking off the glass after it has been cut by means of cutting wheels 5 provided at the bifurcate free end of the cutter head 1 in a housing 6 of a piece of flexible material, preferably plastic. The cutting wheels 5 are supported in opposite mountings at the upper and lower periphery of the housing 6. Each of these mountings includes two crossing recesses 7 and 8, as will be apparent from FIG. 2. Either cutting wheel 5 comprises an axle 9 clampingly inserted in the recess 7 so that the cutting wheel 5 can freely rotate in the recess 8 extending crosswise of the recess 7. The housing 6 further includes two opposite and vertically extending U-shaped guides or grooves 10 and 11 receiving the tightly fitting extensions 12 and 13 of the bifurcate free end of the cutter head 1. Between the U-shaped guides 10 and 11 there extend the recesses 8 in which the cutting wheels 5 are disposed for rotation. The housing 6 can be easily pushed on and removed from the extensions 12 and 13 of the bifurcate end of the cutter head 1 owing to its U-shaped guides 10 and 11, thereby to permit exchangeability of the cutting wheels 5 so that, in this manner, one thereof will be ready for cutting in any case. If a cutting wheel 5 has worn off and the other one is to be moved into the working position, one need only change the position of the housing 6, i.e. pull it off the extensions 12 and 13 and push it thereon again the other way round, after which the second cutting wheel 5 will be ready for cutting.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description and all changes which come within the meaning and range of equivalency of the claim are therefore intended to be embraced therein. For example, it is within the scope of the present invention to provide the housing 6 with only one cutting wheel instead of with two.

I claim:

In a glass cutter comprising a handle and head fixed to one end thereof, said head being bifurcated at one end and including a pair of opposed mutually parallel extensions defining a terminally opening groove at said one end, and a cutter assembly consisting of a one-piece housing comprising a flexible material and including oppositely opening grooves complementary to opposed portions of said extensions and grippingly and removably engaged therebetween, said housing including opposed recesses substantially normal to said grooves, said housing including bearing portions opening into opposite sides of said recesses, and a cuttting wheel having an integral shaft journaled in the respective bearing portions and having a cutting edge projecting beyond the outer margin of said housing at said recess portions, the cutting edge of one of said wheels extending beyond the terminal end of said extensions, said other cutting wheel being disposed between said extensions intermediately of said head in a stored position.

References Cited by the Examiner
UNITED STATES PATENTS

| | | | |
|---|---|---|---|
| 2,341,030 | 2/1944 | Fletcher | 30—164.95 |
| 2,636,266 | 4/1953 | Sweet | 30—342 X |
| 2,652,659 | 9/1953 | Fletcher | 30—164.95 |
| 2,746,147 | 5/1956 | Booth | 30—339 |
| 2,885,779 | 5/1959 | Newkirk | 39—162 |
| 3,049,182 | 8/1962 | Pelow | 30—164 X |

WILLIAM FELDMAN, *Primary Examiner.*

JAMES L. JONES, JR., *Examiner.*